United States Patent
Cimaz

(10) Patent No.: US 9,991,722 B2
(45) Date of Patent: Jun. 5, 2018

(54) METHOD FOR MANAGING CONTACTLESS POWER TRANSFER FROM A TRANSMITTER TO A RECEIVER, AND CORRESPONDING TRANSMITTER

(71) Applicant: STMicroelectronics (Grand Ouest) SAS, Delarue (FR)

(72) Inventor: Lionel Cimaz, Rennes (FR)

(73) Assignee: STMicroelectronics (Grand Ouest) SAS, Delarue (FR)

( * ) Notice: Subject to any disclaimer, the term of this patent is extended or adjusted under 35 U.S.C. 154(b) by 219 days.

(21) Appl. No.: 14/963,056

(22) Filed: Dec. 8, 2015

(65) Prior Publication Data
US 2016/0372934 A1 Dec. 22, 2016

(30) Foreign Application Priority Data
Jun. 18, 2015 (FR) ...................... 15 55568

(51) Int. Cl.
| | |
|---|---|
| H01F 38/00 | (2006.01) |
| H02J 5/00 | (2016.01) |
| H02J 17/00 | (2006.01) |
| B60L 11/18 | (2006.01) |
| H02J 7/02 | (2016.01) |

(52) U.S. Cl.
CPC .............. *H02J 5/005* (2013.01); *H02J 17/00* (2013.01); *B60L 11/182* (2013.01); *H02J 7/025* (2013.01)

(58) Field of Classification Search
None
See application file for complete search history.

(56) References Cited

U.S. PATENT DOCUMENTS

| | | | | |
|---|---|---|---|---|
| 7,382,636 | B2 * | 6/2008 | Baarman | H02J 5/005 363/132 |
| 7,487,921 | B2 * | 2/2009 | Takahashi | G06K 7/0008 235/441 |
| 7,554,316 | B2 * | 6/2009 | Stevens | H02J 5/005 307/104 |
| 9,685,814 | B1 * | 6/2017 | Moyer | H02J 7/025 |
| 2004/0130916 | A1 * | 7/2004 | Baarman | A61L 2/10 363/21.02 |

(Continued)

FOREIGN PATENT DOCUMENTS

| | | |
|---|---|---|
| EP | 2779358 A2 | 9/2014 |
| JP | P3392016 B2 | 3/2003 |
| WO | WO-2013098240 A1 | 7/2013 |

OTHER PUBLICATIONS

INPI Search Report and Written Opinion for FR 1555568 dated Nov. 5, 2015 (8 pages).

*Primary Examiner* — Lincoln Donovan
*Assistant Examiner* — Khareem E Almo
(74) *Attorney, Agent, or Firm* — Crowe & Dunlevy

(57) ABSTRACT

Contactless power transfer from a transmitter to a receiver is managed. A magnetic field is generated by the transmitter from a command at a control frequency for a switching resonant circuit. The receiver communicates information to the transmitter through modulation of the magnetic field. The modulation is detected by the transmitter so as to extract the information. An adjustment of the control frequency is then made according to the received information. The modulation detection involves detecting variations in the control frequency.

30 Claims, 2 Drawing Sheets

(56) References Cited

U.S. PATENT DOCUMENTS

| | | | |
|---|---|---|---|
| 2007/0139000 A1* | 6/2007 | Kozuma | H02J 5/005 320/108 |
| 2007/0279002 A1* | 12/2007 | Partovi | H02J 7/0027 320/115 |
| 2008/0164839 A1* | 7/2008 | Kato | H02J 7/025 320/108 |
| 2009/0174264 A1 | 7/2009 | Onishi et al. | |
| 2010/0066176 A1* | 3/2010 | Azancot | H02J 5/005 307/104 |
| 2011/0062793 A1* | 3/2011 | Azancot | H01F 38/14 307/116 |
| 2012/0235636 A1* | 9/2012 | Partovi | H02J 7/025 320/108 |
| 2013/0249479 A1* | 9/2013 | Partovi | H02J 7/025 320/108 |
| 2013/0285604 A1* | 10/2013 | Partovi | H02J 7/0042 320/108 |
| 2013/0285605 A1* | 10/2013 | Partovi | H02J 7/0042 320/108 |
| 2013/0300204 A1* | 11/2013 | Partovi | H01F 38/14 307/104 |
| 2016/0056664 A1* | 2/2016 | Partovi | H02J 7/025 307/104 |
| 2016/0372934 A1* | 12/2016 | Cimaz | H02J 17/00 |
| 2017/0033591 A1* | 2/2017 | Govindaraj | H02J 7/042 |
| 2017/0194809 A1* | 7/2017 | Partovi | H02J 7/025 |

\* cited by examiner

METHOD FOR MANAGING CONTACTLESS POWER TRANSFER FROM A TRANSMITTER TO A RECEIVER, AND CORRESPONDING TRANSMITTER

PRIORITY CLAIM

This application claims priority from French Application for Patent No. 1555568 filed Jun. 18, 2015, the disclosure of which is incorporated by reference.

TECHNICAL FIELD

Implementation and embodiments herein concern contactless power transfer from a transmitter to a receiver, for example—but without implying limitation—in order to supply power to a component of the receiver or in order to recharge a battery thereof.

BACKGROUND

Contactless charging technology allows contactless power transfer from a power source (for example a charger) to a load, for example a wireless communication appliance, for example a cellular mobile telephone, for the air space separating the charger and the load.

Among the various existing contactless charging standards, it is possible to cite the Qi standard developed by the "Wireless Power Consortium" (WPC), which is well known to a person skilled in the art, and notably the low-power version, which can deliver a power of up to 5 W.

For all intents and purposes, a person skilled in the art will be able to refer to the document entitled "System Description Wireless Power Transfer" volume I: Low Power, Part 1: Interface Definition, version 1.1.2, June 2013 (incorporated by reference).

Briefly, contactless power is transferred from a base station or transmitter to a receiver that is magnetically coupled to the transmitter by means of coils, for example.

The power transfer is based on a magnetic field generated by the transmitter and captured by the receiver.

The Qi standard allows various techniques (topologies) for generating the magnetic field in the transmitter. However, this magnetic field is always an oscillating field and the range of frequencies is between 110 kHz and 205 kHz.

The way in which the magnetic field is generated and the way in which the power varies depend on the topology used in the transmitter.

The receiver converts this magnetic field into an electrical potential that is used in order to charge the batteries or supply power to a device.

So as to be able to regulate and provide security for the system, a communication channel exists between the receiver and the transmitter.

The receiver measures the power that it receives and compares it with the power that it needs. The difference between these two power values is a regulation error.

This regulation error is transmitted to the transmitter by using the communication channel and the transmitter adapts the power of the transmitted field taking account of the received regulation error.

The communication from the receiver to the transmitter is based on modulation of the magnetic field resulting from a variation in the load at the terminals of the antenna of the receiver.

The transmitter can measure this load variation in order to deduce therefrom the transmitted bits and finally the transmitted message.

The transmitter conventionally comprises an inductive capacitive resonant system in which the inductive element is likewise the coil that generates the magnetic field. This resonant system is excited by a driving circuit ("driver"), and these together form a switching resonant circuit.

The modulation of the magnetic field that is performed by the receiver in order to communicate with the transmitter leads to a voltage variation at the terminals of the resonant circuit and to a variation in the current flowing in this resonant circuit.

Therefore, at present, a first solution in order to demodulate the receiver/transmitter communication channel consists in measuring this voltage variation of the resonant circuit.

However, such a solution requires numerous components and is sensitive to voltage noise from the receiver load.

Another solution consists in measuring the current flowing in the resonant circuit.

However, there again, such a solution requires numerous components, it is likewise sensitive to current noise from the receiver load, and the insertion of a current measuring interface decreases efficiency and can be critical to implement.

SUMMARY

According to one implementation and embodiment, a solution is proposed in order to demodulate the receiver/transmitter communication channel that provides better efficiency at lower cost while being less complex to implement and providing better immunity to receiver noise.

According to one implementation and embodiment, it is proposed that the communication from the receiver be demodulated by measuring the variation in control frequency for the switching resonant circuit.

Thus, according to one aspect, a method for managing contactless power transfer from a transmitter to a receiver that are coupled to one another is proposed, the method comprising generation of a magnetic field by the transmitter from a command at a control frequency for a switching resonant circuit, communication of information by the receiver involving modulation of the magnetic field, detection of said modulation by the transmitter so as to extract said information and adjustment of said control frequency according to the received information.

According to a general feature of this aspect, the detection of the modulation comprises detection of the variations in the control frequency.

According to one implementation, the switching resonant circuit is controlled by means of a control signal that is internal to an oscillating loop that maintains itself at said control frequency, this loop incorporating the switching resonant circuit; the control signal is a delayed signal resulting from detection of the changes of slope of a signal that is internal to the resonant circuit and the detection of the variations in said control frequency comprises determination of the period of the control signal.

The adjustment of the control frequency, which allows more or less power to be delivered to the receiver, is advantageously performed by adjusting the value of the delay of the delayed signal.

As the transmitter has a self-oscillating loop, such a solution is sensitive to the impedance of the receiver. Thus, according to the location of the receiver in relation to the transmitter, the system may not naturally operate at a constant frequency, which may be problematic in some applications, for transferring the appropriate power.

Therefore, it is advantageous to provide a second, slower loop.

In other words, according to one implementation, the adjustment of the control frequency comprises determination of an average for the control signal periods, formation of a difference between this average and a target period and adjustment of said delay according to the result of this difference.

Thus, with such an implementation, it is possible to detect the frequency variations that are linked to the modulation of the field by the receiver while operating, on average, at a defined frequency corresponding to the desired transmitted power.

According to another aspect, a transmitter is proposed, comprising a switching resonant circuit that is intended to be coupled to an antenna of a receiver for contactless power transfer from the transmitter to the receiver, means for managing said transfer having generating means for generating a magnetic field from a command at a control frequency for the switching resonant circuit, detection means for detecting modulation of the magnetic field, which modulation is representative of information communicated by the receiver, for the purpose of extracting said information therefrom, and processing means that are configured to adjust said control frequency according to said received information.

According to a general feature of this other aspect, the detection means are configured to detect variations in the control frequency.

According to one embodiment, the generating means comprise an oscillating loop that maintains itself at said control frequency and incorporates said switching resonant circuit, a slope detection module that is configured to detect changes of slope of a signal that is internal to the resonant circuit and to deliver an intermediate signal, an adjustable delay means that is connected to the output of the slope detection module in order to delay the intermediate signal and to deliver a control signal for the switching resonant circuit, and the detection means comprise means for determining the period of said control signal.

According to one embodiment, the processing means are configured to adjust the value of the delay of the delay means.

According to one embodiment, the processing means have an averaging module that is configured to determine an average for said periods of control signal, and a subtracting module that is configured to form a difference between this average and a target period so as to adjust the delay value of the delay means according to the result of said comparison.

BRIEF DESCRIPTION OF THE DRAWINGS

Other advantages and features of the invention will emerge from the detailed description of implementations and embodiments, which are by no means limiting, and the appended drawings, in which.

DETAILED DESCRIPTION

The invention will now be described more precisely within the context of the Qi standard but is no way limited to this particular example and can notably apply to any domain in which there is magnetic coupling between a transmitter and a receiver, the transmitter driving a power carrier to the receiver by using this magnetic coupling, and the receiver itself modulating the carrier in order to communicate with the transmitter.

Figure 1:
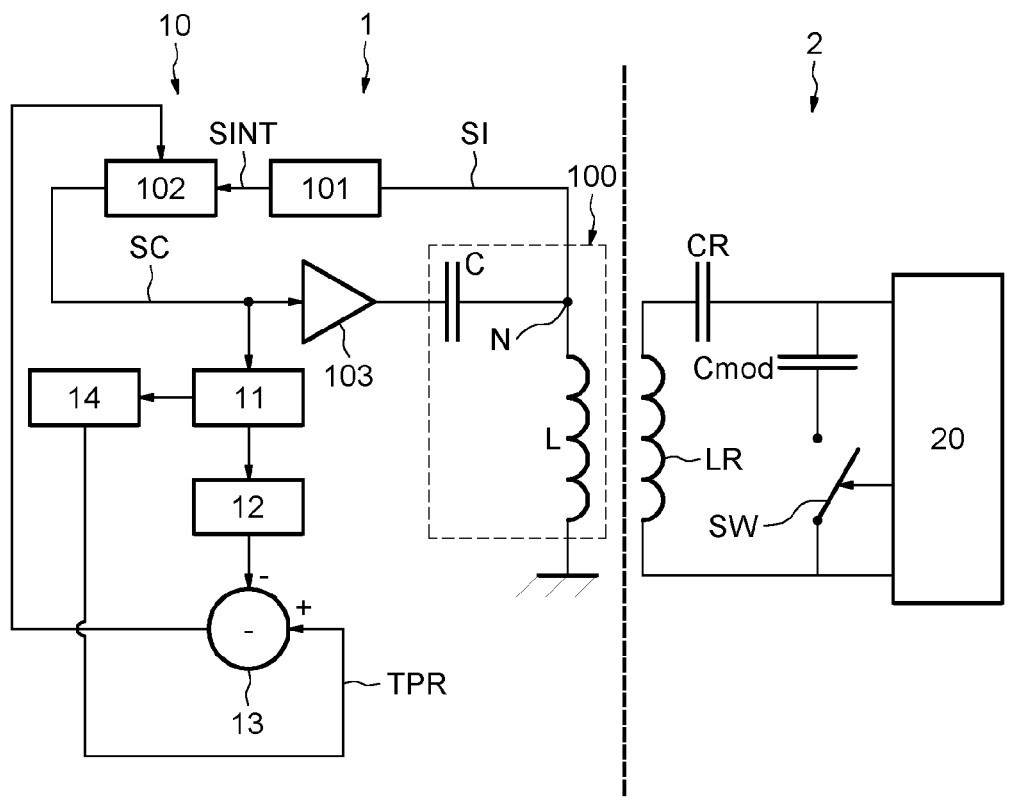
FIGS. 1 to 3 schematically illustrate embodiments and implementations.

In FIG. 1, the reference 1 denotes a transmitter, for example a base station or a charger, and the reference 2 denotes a receiver, which is magnetically coupled to the transmitter, for example a cellular mobile telephone, for the purpose of power transfer from the transmitter to the receiver in order, by way of example, to recharge a battery of the latter or to supply power to a component or device accommodated inside the receiver.

The transmitter 1 has an inductive capacitive resonant circuit 100 having a capacitive element C connected to an inductive element L, such as a coil, which is itself connected to a ground reference node. This resonant circuit is driven by a driving circuit ("driver") 103. The resonant circuit 100 and driving circuit 103 assembly forms a switching resonant circuit.

Figure 2:
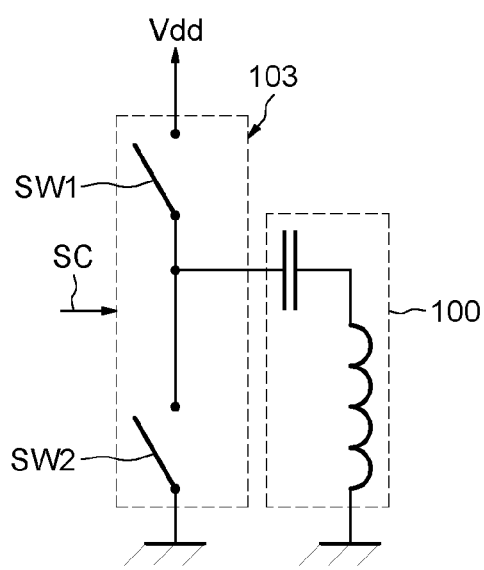

By way of non-limiting example, an embodiment of a driving circuit 103 is illustrated in FIG. 2. In this case, it has two switches, such as MOS transistors, SW1 and SW2, which are connected in series between the supply voltage node Vdd and the ground reference node. These two switches, which form a half-bridge, are driven by a control signal SC that alternates between high levels and low levels. The control signal SC has a control frequency.

Of course, other embodiments of a driving circuit 103 are possible, such as full-bridge assemblies.

The signal SI, which is the signal that is internal to the resonant circuit that is present at the oscillating node N, which is common to the interconnection of capacitive element C and inductive element L, is an oscillating signal, centered around the ground reference voltage in the present case. The period of this signal SI corresponds to the frequency of the control signal SC.

This signal SI is delivered to a slope detector 101 that is configured to detect the changes of slope of the internal signal SI.

Figure 3:
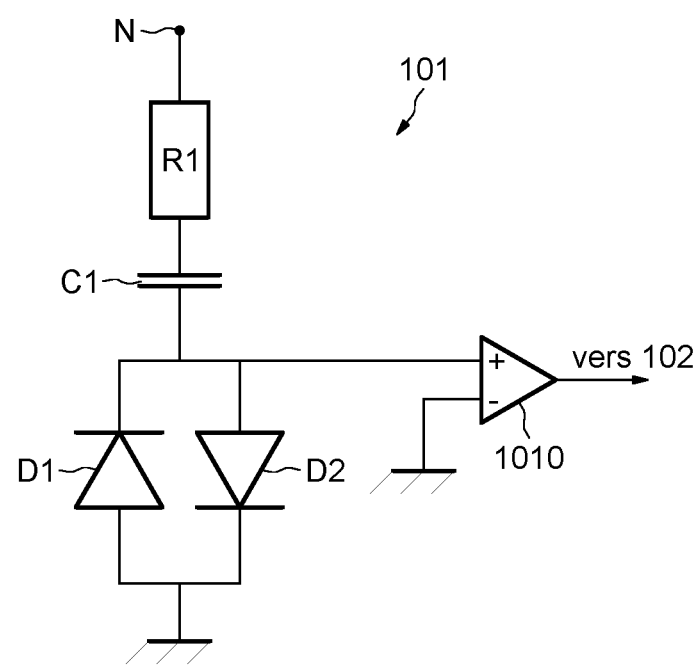

In this case, this slope detector is therefore a quarter-wave detector, an implementation example of which is illustrated schematically in FIG. 3.

In this case, detector 101 has a resistor R1 in series with a capacitor C1, forming an RC filter connected to the oscillating node N. This RC filter allows any noise to be filtered.

The output of the RC filter is connected firstly to the non-inverting (+) input of a comparator 1010 and secondly to the ground reference node through two diodes D1 and D2 connected back to back.

The inverting (−) input of the comparator 1010 is in this case connected to the ground reference node and the output of the comparator is the output of the slope detector 101.

The output of the slope detector 101, which delivers the intermediate signal SINT, is connected to the input of a programmable or adjustable delay circuit 102 (reference vers 102) that can be implemented in the digital domain in a manner that is conventional and known per se. The value of the delay is equal to approximately one quarter of the period of the control signal SC (corresponding to the period of the signal SI that is present at the node N).

The output of the delay circuit 102, which delivers the control signal SC, is looped back to the control input of the driving circuit 103.

It can therefore be seen in this case that a loop 10 having the switching resonant circuit 100, 103, the slope detector 101 and the delay circuit 102 has been formed within the transmitter.

By choosing the appropriate polarity, that is to say by arranging matters such that a high level of the control signal SC closes the switch SW1 connected to the supply voltage Vdd and that a low level of the control signal SC closes the switch SW2 connecting the resonant circuit to the ground, the loop 10 is self-oscillating.

Furthermore, the oscillation frequency of the loop is above the resonant frequency of the resonant circuit 100, which advantageously makes it possible to obtain automatic voltage inversion upon connection to the ground or to the supply voltage (Vdd) of the oscillating circuit 100.

The adjustment of the value of the delay of the delay circuit 102 makes it possible to adjust the value of the power transmitted to the receiver.

Before returning in more detail to the operation of this system, the structure of the receiver 2 will be described.

The receiver 2 likewise has an inductive capacitive circuit having an inductive element LR, for example a coil, which is coupled to the coil L of the circuit 100, and a capacitive element CR.

The various components and notably the battery of the receiver 2 are denoted as a whole by the reference 20 and notably have a rectifier bridge (not shown in this case for reasons of simplification) that is connected to the terminals of the inductive capacitive circuit LR, CR.

The receiver 2 likewise has a modulation capacitor Cmod, which can be switched by a switch SW, for example an MMOS transistor, the assembly being connected to the terminals of the inductive capacitive circuit LR, CR.

The communication between the receiver 2 and the transmitter 1 is effected by modulation of the magnetic field transmitted by the transmitter 1 via the coil L. This modulation is effected in this case by connecting or disconnecting the modulation capacitor Cmod of the receiver. Thus, the connection of the capacitor Cmod will slightly modify the total capacitive value of the resonant circuit 100.

Moreover, this modification of capacitive value will produce a frequency variation for the control signal SC that is produced by the loop 10.

The detection of this frequency variation will allow the receiver/transmitter communication channel to be demodulated and therefore the data and messages transmitted by the receiver to the transmitter, which relate notably to the power regulation error, to be extracted therefrom.

More precisely, the detection of the variations in the control frequency of the signal SC comprises determination of the period of this control signal SC.

This determination can be performed using a timer unit 11 that can be implemented in the digital domain, for example using a counter.

The value of the period of the control signal, as measured by the timer 11, is delivered to a processing circuit 14, for example a microcontroller, that deduces therefrom whether or not the capacitor Cmod is connected, and therefore the logic value of the bit transmitted by the receiver.

Thus, as a rough guide, if the capacitor Cmod is actually connected (switch SW closed) leading to a variation in the period of the signal SC, it is then possible to consider that a logic "1" is transmitted, for example. In the opposite case, that is to say in the absence of frequency variation, corresponding to disconnection of the capacitor Cmod (switch SW open), a logic "0" is assumed to be transmitted.

As indicated above, the communication from the receiver to the transmitter makes it possible, by way of example, to transmit a message indicating whether or not the transmitted power is sufficient.

On reading this message, the microcontroller 14 can then adjust the value of the delay 102 so as to modify the frequency of the control signal SC.

Of course, the switching frequency of the capacitor Cmod, and therefore the frequency variation, is advantageously much lower than the frequency of the control signal SC. As a rough guide, for a system operating at 110 kHz, which corresponds to a period of 9.1 microseconds for the control signal, it will be possible to choose a switched or unswitched time in order of 500 microseconds for the switch SW. Thus, the capacitor Cmod will remain connected or unconnected for at least 50 periods of the signal SC, which is broadly sufficient for determining the frequency variation.

Given that the transmitter behaves in the manner of an oscillator, such a solution is sensitive to the impedance of the receiver. The reason for this is that, depending on the location of the receiver in relation to the transmitter, the system will not naturally operate at a constant frequency, which may be problematic in some cases for transferring the appropriate power.

Therefore, provision is made for a second, slower loop to be formed. More precisely, an averaging circuit 12 is used to determine the average of the periods of the control signal SC, and a difference is performed between this average and a target period TPR, computed by the microcontroller 14, obtained by a subtractor 13.

The result of this difference, when looped back to the delay circuit 102, allows the value of the delay of the delay circuit 102 to be adjusted.

With these two loops, it is then possible to detect the frequency variations linked to the modulation of the magnetic field that is performed by the receiver when operating, on average, at a defined frequency.

By way of example, by using:
 a coil having an inductive value of 6.3 µH and a capacitive element C having a capacitive value of 400 nF, which corresponds to examples of values that are compatible with the Qi standard,
 a capacitor Cmod with a value of 10 nanofarads, a transmitter/receiver coupling factor ranging from 0.5 to 0.9, and
 a load that can reach 5 W by the receiver,
 a system that is capable of operating at a frequency ranging from 110 kHz to 200 kHz while being capable of detecting frequency variations from 2 kHz to 5 kHz is obtained, which can easily be detected by a digital timer.

The invention claimed is:
1. A method for managing contactless power transfer from a transmitter to a receiver that are coupled to one another, comprising:
 generating a magnetic field by the transmitter from a command at a control frequency for a switching resonant circuit,
 controlling the switching resonant circuit with a control signal that is internal to an oscillating loop that maintains itself at said control frequency and incorporates said switching resonant circuit,
 generating the control signal as a delayed signal resulting from detection of the changes of slope of a signal that is internal to the switching resonant circuit,
 communicating information by the receiver involving modulation of said magnetic field, detecting said modulation by the transmitter so as to extract said information by detecting variations in the control frequency; and adjusting said control frequency according to said received information.

2. The method according to claim 1, wherein detecting comprises determining the period of said control signal.

3. The method according to claim 1, wherein adjusting comprises adjusting a delay of said delayed signal.

4. The method according to claim 2, wherein adjusting comprises:
determining an average for said periods of the control signal,
forming a difference between the average and a target period; and
adjusting a delay of said delayed signal according to said difference.

5. A transmitter, comprising:
a switching resonant circuit configured to be coupled to an antenna of a receiver for contactless power transfer to the receiver,
a circuit configured to manage said contactless power transfer comprising:
a generator circuit configured to generate a magnetic field from a command at a control frequency for the switching resonant circuit, wherein the generator circuit comprises:
an oscillating loop that maintains itself at said control frequency and incorporates said switching resonant circuit,
a slope detection module configured to detect changes of slope of a signal that is internal to the resonant circuit and to deliver an intermediate signal, and
an adjustable delay circuit connected to the output of the slope detection module in order to delay the intermediate signal and to deliver a control signal for the switching resonant circuit,
a detector circuit configured to detect modulation of the magnetic field that is representative of information communicated by the receiver for the purpose of extracting said information, and
a processing circuit configured to adjust said control frequency according to said received information,
wherein the detector circuit is further configured to detect variations in the control frequency.

6. The transmitter according to claim 5, wherein the detector circuit is further configured to determine the period of said control signal.

7. The transmitter according to claim 5, wherein the processing circuit is configured to adjust a value of the delay of the adjustable delay circuit.

8. The transmitter according to claim 6, wherein the processing circuit further includes:
an averaging circuit configured to determine an average for said periods of the control signal, and
a subtracting circuit configured to form a difference between the average and a target period so as to adjust a value of the delay of the adjustable delay circuit according to the difference.

9. A transmitter, comprising:
a switching resonant circuit generating an oscillating signal in response to a control signal to produce a magnetic field;
a slope detection module configured to detect changes of slope of the oscillating signal, a delay circuit receiving an output of the slope detection module and implementing a variable delay to control power transmission to a receiver;
wherein a change a frequency of the control signal is indicative of modulation of said magnetic field by the receiver; and
a circuit configured to determine a period of the control signal, compare the determined period to a target period, and adjust the variable delay implemented by the delay circuit in response to a difference between the determined period and the target period.

10. The transmitter according to claim 9, wherein said circuit comprises an averaging circuit configured to determine an average of multiple periods of the control signal, said average compared to the target period.

11. The transmitter according to claim 9, wherein said modulation conveys data information from the receiver to the transmitter.

12. The transmitter according to claim 11, wherein the data information relates to power regulation error.

13. The transmitter according to claim 11, wherein the data information indicates whether transmitted power to the receiver is sufficient.

14. The transmitter according to claim 13, where said circuit comprises data processing circuitry configured to adjust the target period in response to said data information.

15. A method, comprising:
generating an oscillating signal in response to a control signal to produce a magnetic field from a switching resonant circuit;
detecting changes of slope of the oscillating signal;
generating the control signal from the detected changes of slope with a variable delay to control power transmission to a receiver;
wherein a change a frequency of the control signal is indicative of modulation of said magnetic field by the receiver;
determining a period of the control signal;
comparing the determined period to a target period; and
adjusting the variable delay in response to a difference between the determined period and the target period.

16. The method according to claim 15, further comprising determining an average of multiple periods of the control signal, wherein comparing comprised comparing said average to the target period.

17. The method according to claim 15, wherein said modulation conveys data information from the receiver to the transmitter.

18. The method according to claim 17, wherein the data information relates to power regulation error.

19. The method according to claim 17, wherein the data information indicates whether transmitted power to the receiver is sufficient.

20. The method according to claim 19, further comprising adjusting the target period in response to said data information.

21. A method for managing contactless power transfer from a transmitter to a receiver that are coupled to one another, comprising:
generating a magnetic field by the transmitter from a command at a control frequency for a switching resonant circuit,
controlling the switching resonant circuit with a control signal that is internal to an oscillating loop that maintains itself at said control frequency and incorporates said switching resonant circuit, and generating the control signal as a delayed signal resulting from detection of the changes of slope of a signal that is internal to the switching resonant circuit.

22. The method according to claim 21, further comprising:
communicating information by the receiver by modulating said magnetic field,
detecting said modulation by the transmitter so as to extract said information by detecting variations in the control frequency; and
adjusting the delayed signal in response to said received information.

23. The method according to claim 21, wherein detecting comprises determining the period of said control signal.

24. The method according to claim 23, wherein adjusting comprises:
determining an average for said periods of the control signal,
forming a difference between the average and a target period; and
adjusting said a delay of the delayed signal in response to said difference.

25. A transmitter, comprising:
a switching resonant circuit configured to be coupled to an antenna of a receiver for contactless power transfer to the receiver, and
a circuit configured to manage said contactless power transfer comprising:
a generator circuit configured to generate a magnetic field from a command at a control frequency for the switching resonant circuit, wherein the generator circuit comprises:
an oscillating loop that maintains itself at said control frequency and incorporates said switching resonant circuit,
a slope detection module configured to detect changes of slope of a signal that is internal to the resonant circuit and to deliver an intermediate signal, and
an adjustable delay circuit connected to the output of the slope detection module in order to delay the intermediate signal and to deliver a control signal for the switching resonant circuit.

26. The transmitter according to claim 25, further comprising:
a detector circuit configured to detect modulation of the magnetic field that is representative of information communicated by the receiver, and
a processing circuit configured to adjust the delay of the intermediate signal in response to said received information.

27. The transmitter according to claim 26, wherein the detector circuit operates to detect variations in the control frequency.

28. The transmitter according to claim 26, wherein the processing circuit is configured to adjust the value of the delay of the adjustable delay circuit.

29. The transmitter according to claim 26, wherein the processing circuit includes:
an averaging circuit configured to determine an average of periods of the control signal, and
a subtracting circuit configured to form a difference between the average and a target period so as to adjust the delay value of the adjustable delay circuit according to the difference.

30. The transmitter according to claim 25, wherein the detector circuit is further configured to determine the period of said control signal.

* * * * *